3,374,250
PHENYLACETONITRILE OXIMES
John S. Heckles, Lancaster, and Charles D. Mitchell, Willow Street, Pa., assignors to Armstrong Cork Company, Lancaster, Pa., a corporation of Pennsylvania
No Drawing. Filed Aug. 3, 1965, Ser. No. 477,023
1 Claim. (Cl. 260—396)

This invention relates to phenylacetonitrile oximes, and more particularly to such oximes which contain a substituted cyclohexadiene ring.

The phenylacetonitrile oximes of the present invention have the formula

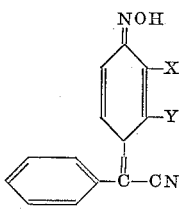

wherein X and Y are selected from the group consisting of —H,

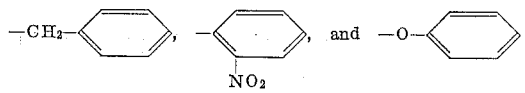

provided that Y is not

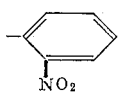

and one and only one of X and Y is hydrogen.

The compounds are useful as ultraviolet light absorbers, particularly when distributed throughout a film of a thermoplastic resin such as polyamides, the polycarbonates, or the acrylates. The phenylacetonitrile oximes of the present invention may be taken up in a suitable inert solvent system which also contains the dissolved polymer. Bottles or other glass containers, or sheets of glass may then be coated in any convenient manner with the solution. On solution evaporation, a stable, ultraviolet light absorbing film will be left on the glass.

The following examples illustrate several embodiments of the invention.

EXAMPLE 1

Preparation of 3-phenoxy-4-oxo-α-phenyl-2,5-cyclohexadiene-Δ$^{1,α}$-acetonitrile oxime Into a 500 ml. four-necked flask, fitted with thermometer, stirrer, reflux condenser, and dropping funnel, was placed a solution of 25 g. (0.385 mole, assay 86.3%) of potassium hydroxide dissolved in 50 ml. of absolute methanol. The solution was cooled to 10° C., and 7.45 g. (0.064 mole) of benzyl cyanide was added in one portion. o-Nitrophenyl phenyl ether (13.56 g., 0.063 mole) was added dropwise during 5 minutes at 10° C. with stirring. The deep red reaction mixture was stirred and held at room temperature for 30 minutes with an ice bath until the initial exothermic reaction subsided. The mixture was then stirred at room temperature an additional 3½ hours. During this time a large amount of deep red solid separated. The addition of 200 ml. of water with cooling and stirring gave a cloudy solution which cleared when 50 ml. of absolute methanol was added. Acidification of the dark red solution with dilute acetic acid gave a bright yellow semi-solid which, when collected by filtration, dried in vacuo, and triturated with absolute methanol, gave 16.5 g. (83%) of bright yellow solid, M.P. 135–140°. Yellow crystals of the pure oxime (M.P. 140–141.2°) were obtained after four recrystallizations from benzene.

Calc'd for $C_{20}H_1N_2O_2$: C, 76.42; H, 4.49; N, 8.91. Found: C, 76.33; H, 4.29; N, 8.76.

EXAMPLE 2

Preparation of 2-phenoxy-4-oxo-α-phenyl-2,5-cyclohexadiene-Δ$^{1,α}$-acetonitrile oxime Into a 500 ml. three-necked flask fitted with thermometer, stirrer, reflux condenser, and dropping funnel, was placed a solution of 25 g. (0.385 mole, assay 86%) of potassium hydroxide dissolved in 50 ml. of absolute methanol. To the cooled solution (10°) was added in one portion 7.45 g. (0.063 mole) of benzyl cyanide followed by the dropwise addition of 13.56 g. (0.063 mole) of m-nitrophenyl phenyl ether. The reaction temperature was held at room temperature by an ice bath until the initial exothermic reaction subsided. Within 30 minutes a deep red solid precipitated. After stirring an additional 3½ hours at room temperature a solution of 200 ml. absolute methanol and 100 ml. water was added while cooling and stirring. The deep red solution was pressure filtered through a sintered glass tube leaving 5.8 g. of ether soluble red tar in the reaction flask.

The deep red alkaline filtrate was washed twice with 50-ml. portions of ether. Acidification of the filtrate with dilute acetic acid gave 10.14 g. of orange solid which, when collected by filtration, air dried, and triturated with ether, gave 5.5 g. (28%) of crude yellow oxime, M.P. 158–160°. Yellow crystals of the pure oxime (M.P. 161–162°) were obtained after five recrystallizations from benzene.

Calc'd for $C_{20}H_{14}N_2O_2$: C, 76.42; H, 4.49; N, 8.91. Found: C, 76.25; H, 4.32; N, 8.74.

EXAMPLE 3

Preparation of 4-oxo-3-o-nitrophenyl-2,5-cyclohexadiene-Δ$^{1,α}$-acetonitrile oxime Into a 500 ml. four-necked flask, fitted with reflux condenser, dropping funnel, stirrer, and thermometer, were placed 25 g. (0.385 mole) of potassium hydroxide (assay 86.3%) and 50 ml. of absolute methanol. The mixture was stirred until the potassium hydroxide dissolved, then cooled to 20°. Benzyl cyanide (9.14 g., 0.078 mole) was added in one portion followed by the addition of 8.03 g. (0.034 mole) of 2,2'-dinitrobiphenyl in one portion through a powder funnel. The mixture became deep blue immediately. The reaction temperature was kept below 25° C. during the addition of the nitro compound by an ice bath. The mixture was stirred at 20–25° for four hours during which time a small amount of solid and a large amount of tar separated making stirring difficult. Water (250 ml.) was added and the mixture was stirred vigorously for 15 minutes. The deep blue aqueous phase was decanted from the tar, filtered, washed with ether until the extracts were nearly colorless, and acidified with dilute acetic acid. The resulting pale yellow solid, when collected by filtration, washed with water, and dried in a vacuum desiccator, gave 0.25 g. of solid A.

The tar was dissolved in benzene—the addition of a small amount of acetic acid was necessary to achieve complete solution. The resulting deep red benzene solution was extracted with 30-ml. portions of 5% potassium hydroxide until the extracts became colorless, washed with water until neutral to litmus, and dried over anhydrous sodium sulfate.

The potassium hydroxide extracts were combined, washed with 50-ml. portions of ether until the ether washes became nearly colorless, filtered, and acidified with dilute acetic acid. The resulting pale yellow solid was collected by filtration, washed with water, and dried in a vacuum desiccator. The infrared spectra (IR 10) of solids B and A are identical and contain a moderate highly conjugated nitrile band at 4.52μ, a moderate broad hydroxyl band at 2.93μ, strong nitro bands at 6.53 and 7.42μ, and a strong 9.98μ band.

EXAMPLE 4

*Preparation of 3-benzyl-4-oxo-α-phenyl-2,5-cyclo-hexadiene-Δ¹,ᵅ-acetonitrile oxime*

Into a 300 ml. three-necked flask, fitted with stirrer, dropping funnel, reflux condenser, and thermometer, was placed a solution of 12.5 g. (0.19 mole, assay 86.3%) of potassium hydroxide dissolved in 25 ml. of absolute methanol. Benzyl cyanide (3.7 g., 0.032 mole) was added in one portion at room temperature followed by the rapid dropwise addition of 6.6 g. (0.031 mole) of 2-nitrodiphenylmethane (B.P. 117–118° at 0.06 mm.). The reaction temperature rose to a maximum of 30° C. and a small amount of deep red solid precipitated. The deep red reaction mixture was stirred slowly for 3½ hours at room temperature, then 1 hour at 70° C. On cooling, a voluminous amount of deep red solid precipitated. Methanol (100 ml.) was added with vigorous stirring. The resulting deep red solution was acidified with glacial acetic acid. The addition of 100 ml. of water caused a red oil to separate which crystallized on standing overnight. The crude oxime when collected by filtration, washed with water, and air dried weighed 9.6 g. (99%). Yellow crystals of the pure oxime (M.P. 146–147.5°) were obtained by recrystallization from benzene. Its infrared spectrum contains a strong broad hydroxyl band at 3.02μ, a moderate highly conjugated nitrile band at 4.52μ, and a very strong band characteristic of quinoid oximes at 10.10μ.

EXAMPLE 5

*Preparation of 2-benzyl-4-oxo-α-phenyl-2,5-cyclo-hexadiene-Δ¹,ᵅ-acetonitrile oxime*

Into a 300 ml. three-necked flask, fitted with thermometer, stirrer, dropping funnel, and reflux condenser, was placed a solution of 12.5 g. (0.19 mole, assay 86.3%) of potassium hydroxide dissolved in 25 ml. of absolute methanol. The solution was cooled to 10° C., and 3.7 g. (0.032 mole) of benzyl cyanide was added in one portion. 3-nitrodiphenylmethane (B.P. 116–120° at 0.06 mm.) was added dropwise between 10–20° with stirring and cooling. The deep red reaction mixture was stirred slowly for 4½ hours at 25° C. Absolute methanol (100 ml.) was added with rapid stirring and cooling. The resulting deep red mixture was acidified with glacial acetic acid, then filtered. Addition of water to the filtrate caused the crude oxime (9.5 g., 98%) to separate as a heavy oil.

Confirmation of structure is provided by its infrared spectrum which contains a strong broad hydroxyl band at 3.02μ, a moderate highly conjugated nitrile band at 4.53μ, and a very strong band characteristic of quinoid oximes at 10.10μ.

EXAMPLE 6

A resinous polycarbonate was prepared by the reaction of phosgene and 4,4-bis(4-hydroxy phenyl) pentanoic acid. A film of this polycarbonate was prepared containing 1.7% by weight 3-phenyl-4-oxo-α-phenyl-2,5-cyclohexadiene-Δ¹,ᵅ-acetonitrile oxime and was placed under ultraviolet light for 500 hours in a Weather-Ometer. After 500 hours, the tensile strength of the film was 8,500 p.s.i., compared to an initial value of 10,000 p.s.i. A control film not containing the oxime was completely degraded and useless after the 500 hours exposure in the Weather-Ometer.

We claim:
1. Phenylacetonitrile oximes of the formula

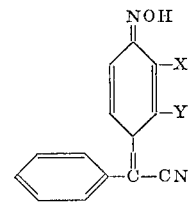

wherein X and Y are selected from the group consisting of —H,

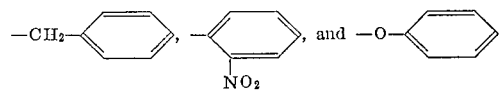

provided that Y is not

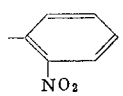

and one and only one of X and Y is hydrogen.

References Cited
UNITED STATES PATENTS
3,156,704  11/1964  Davis _____ 260—396

LORRAINE A. WEINBERGER, *Primary Examiner.*

L. A. THAXTON, *Assistant Examiner.*